(12) United States Patent
Lemens

(10) Patent No.: US 6,539,997 B1
(45) Date of Patent: Apr. 1, 2003

(54) ADHESIVE TRANSFER DEVICE

(75) Inventor: Paul Lemens, Scottsdale, AZ (US)

(73) Assignee: Xyron, Inc., Scottsdale, AZ (US)

( * ) Notice: Subject to any disclaimer, the term of this patent is extended or adjusted under 35 U.S.C. 154(b) by 0 days.

(21) Appl. No.: 09/798,891

(22) Filed: Mar. 6, 2001

Related U.S. Application Data (60) Provisional application No. 60/187,012, filed on Mar. 6, 2000.

(51) Int. Cl.$^7$ .......................... B32B 31/00; B32B 31/04
(52) U.S. Cl. ..................... 156/389; 156/289; 156/495; 156/555
(58) Field of Search ............................... 156/389, 555, 156/580, 241, 390, 495, 540, 184, 230, 288, 289, 344, 538, 391, 494, 496

(56) References Cited

U.S. PATENT DOCUMENTS

| | | | |
|---|---|---|---|
| 4,557,011 A | * 12/1985 | Sartori | .................. 15/104.002 |
| 5,031,938 A | 7/1991 | Instance | |
| 5,174,605 A | 12/1992 | Instance | |
| 5,222,766 A | 6/1993 | Instance | |
| RE34,366 E | 9/1993 | Instance | |
| 5,262,214 A | 11/1993 | Instance | |
| 5,399,403 A | 3/1995 | Instance | |
| 5,470,418 A | 11/1995 | Instance | |
| 5,540,809 A | * 7/1996 | Ida et al. | ..................... 156/344 |
| 5,574,962 A | 11/1996 | Fardeau et al. | |
| 5,580,417 A | 12/1996 | Bradshaw | |
| 5,584,962 A | 12/1996 | Bradshaw et al. | |
| 5,746,878 A | * 5/1998 | Kuhns et al. | ................ 100/331 |
| 6,244,322 B1 | 6/2001 | Paque | |
| 6,270,612 B1 | 8/2001 | Bradshaw | |
| 6,335,067 B1 | 1/2002 | O'Keefe et al. | |

\* cited by examiner

Primary Examiner—Richard Crispino
Assistant Examiner—Sue A. Purvis
(74) Attorney, Agent, or Firm—Pillsbury Winthrop LLP (57) ABSTRACT

The present invention provides an adhesive transfer device comprising a frame and first and second cooperating structures each having a substrate engaging surface, the first cooperating structure being a nip roller rotatably mounted to the frame. The selected substrate and the adhesive carrying substrate can be advanced between the cooperating structures with the substrate engaging surfaces thereof cooperating to apply pressure to the substrates. This causes the first portion of the pressure-sensitive adhesive layer to adhere to the selected substrate and the second portion of the pressure-sensitive adhesive layer to adhere to a pick-up portion of the substrate engaging surface of the nip roller. The pick-up portion of the substrate engaging surface of the nip roller has a greater affinity for adhesive bonding than the surface of the adhesive carrying substrate on which the layer is coated so that as the substrates are discharged from between the cooperating structures, the second portion of the adhesive layer remains adhered to the pick-up portion of the nip roller rather than to the adhesive carrying substrate. An adhesive pick-up device has an adhesive pick-up surface with a greater affinity for adhesive bonding than the pick-up portion of the substrate engaging surface of the nip roller. The adhesive pick-up surface engaging the substrate engaging surface of the nip roller such that, as the nip roller rotates during the adhesive transfer operation, (a) the pick-up portion of the nip roller having the second portion of the adhesive layer adhered thereto engages the adhesive pick-up surface of the pick-up device to adhere to the pick-up surface and (b) the adhesive pick-up device continually advances the adhesive pick-up surface so that the portions of the adhesive pick-up surface with the second portion of the adhesive layer adhered thereto is moved away as the nip roller continues to rotate and is replaced by a portion of the adhesive pick-up surface that is devoid of adhesive.

17 Claims, 5 Drawing Sheets

ADHESIVE TRANSFER DEVICE

The present application claims priority to U.S. Provisional Appln. of Lemens, Ser. No. 60/187,012, filed Mar. 6, 2000, the entirety of which is hereby incorporated into the present application in its entirety.

FIELD OF THE INVENTION

The present invention relates to adhesive transfer devices.

BACKGROUND OF THE INVENTION

U.S. Pat. No. 5,584,962 discloses a laminating and adhesive transfer apparatus. The apparatus of the '962 patent has a frame and a pair of nip rollers that rotate in a cooperating relationship by rotating a crank handle actuator. To perform an adhesive transfer operation, a pair of supply rolls are mounted to the apparatus frame and lead end portions of the supply material are unwound from the supply roll and fed in between the nip rollers.

One of the supply materials is a release liner coated with pressure-sensitive adhesive on a surface thereof and the other supply material is a thin plastic film that has an affinity for bonding with the adhesive (referred to in the art as a mask substrate). A selected substrate to which adhesive is to be applied is fed into the nip rollers between the feed materials. Then, the crank handle is rotated so that the nip rollers cooperate to apply pressure to the substrates fed therebetween and to advance the substrates and discharge them outwardly from the machine. As a result, the adhesive on the release liner adheres to both the selected substrate and the portions of the mask extending around the periphery of the selected substrate.

When the substrates are discharged from the machine, they can be severed using a cutter. Then, the mask substrate is peeled back from the release liner to expose the selected substrate. The mask substrate is provided with a relatively high affinity for adhesive bonding so that all the excess adhesive exposed around the periphery of the selected substrate remains bonded thereto and is removed from the release liner during the peeling of the mask substrate. The mask substrate can be thrown away or otherwise discarded. Then, the selected substrate can be peeled back from the release liner and adhered to a contact surface as desired.

The advantage of the device disclosed in the '962 patent is that it allows for a clean adhesive transfer operation with all the excess adhesive being picked up and taken away by the substrate mask. However, the mask substrate supply roll in the device of the '962 patent creates some inefficiency that it would be desirable to eliminate. For example, the intermediate step of peeling back the adhesive mask substrate introduces an additional step into the operation.

SUMMARY OF THE INVENTION

It is therefore an object of the present invention to provide an adhesive transfer device wherein the use of the adhesive mask is eliminated, but the advantages attained by using the adhesive mask are still retained. To achieve this object, the present invention provides an adhesive transfer device for use with a supply roll carrying a supply of an adhesive carrying substrate for performing an adhesive transfer operation on a selected substrate. The adhesive carrying substrate has a layer of pressure-sensitive adhesive coated on a surface thereof. The device comprises a frame and first and second cooperating structures each having a substrate engaging surface, the first cooperating structure being a nip roller rotatably mounted to the frame. The cooperating structures are mounted to the frame with the substrate engaging surfaces disposed adjacent one another so that the adhesive transfer operation can be initiated by inserting the adhesive carrying substrate and the selected substrate together between the cooperating structures with a first portion of the pressure-sensitive adhesive layer facing the selected substrate and a second portion of the adhesive layer adjacent a periphery of the selected substrate facing the substrate engaging surface of the rotatable nip roller.

The cooperating structures are constructed and arranged such that, after initiating the adhesive transfer operation as aforesaid, the adhesive transfer operation can be continued by advancing the selected substrate and the adhesive carrying substrate between the cooperating structures with the substrate engaging surfaces thereof cooperating to apply pressure to the substrates. This causes the first portion of the pressure-sensitive adhesive layer to adhere to the selected substrate and the second portion of the pressure-sensitive adhesive layer to adhere to a pick-up portion of the substrate engaging surface of the nip roller. The pick-up portion of the substrate engaging surface of the nip roller has a greater affinity for adhesive bonding than the surface of the adhesive carrying substrate on which the layer is coated so that as the substrates are discharged from between the cooperating structures, the second portion of the adhesive layer remains adhered to the pick-up portion of the nip roller rather than to the adhesive carrying substrate.

The device further comprises an adhesive pick-up device that has an adhesive pick-up surface with a greater affinity for adhesive bonding than the pick-up portion of the substrate engaging surface of the nip roller. The adhesive pick-up device is disposed adjacent to the nip roller with the adhesive pick-up surface engaging the substrate engaging surface of the nip roller such that, as the nip roller rotates during the adhesive transfer operation, (a) the pick-up portion of the nip roller having the second portion of the adhesive layer adhered thereto engages the adhesive pick-up surface of the pick-up device with sufficient pressure to cause the second portion of the adhesive to adhere to the pick-up surface so that the second portion of the adhesive layer remains bonded to the adhesive pick-up surface rather than to the substrate engaging surface of the nip roller and (b) the adhesive pick-up device continually advances the adhesive pick-up surface so that the portions of the adhesive pick-up surface with the second portion of the adhesive layer adhered thereto is moved away as the nip roller continues to rotate and is replaced by a portion of the adhesive pick-up surface that is devoid of adhesive.

Other objects, features, and advantages of the present invention will become apparent from the following detailed description, the accompanying drawings, and the appended claims.

DETAILED DESCRIPTION OF THE INVENTION

Figure 1:
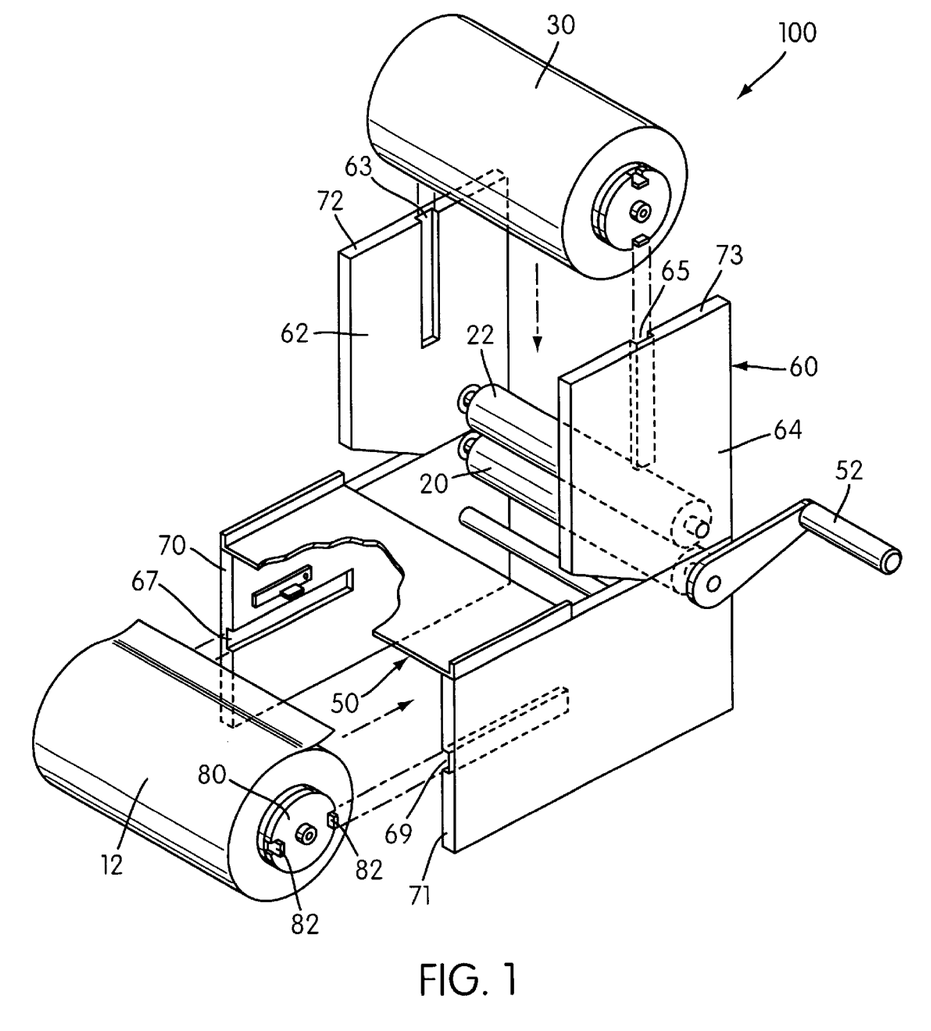
FIG. 1 is a perspective view of an adhesive transfer device constructed in accordance with the principles of the present invention.
Figure 2:
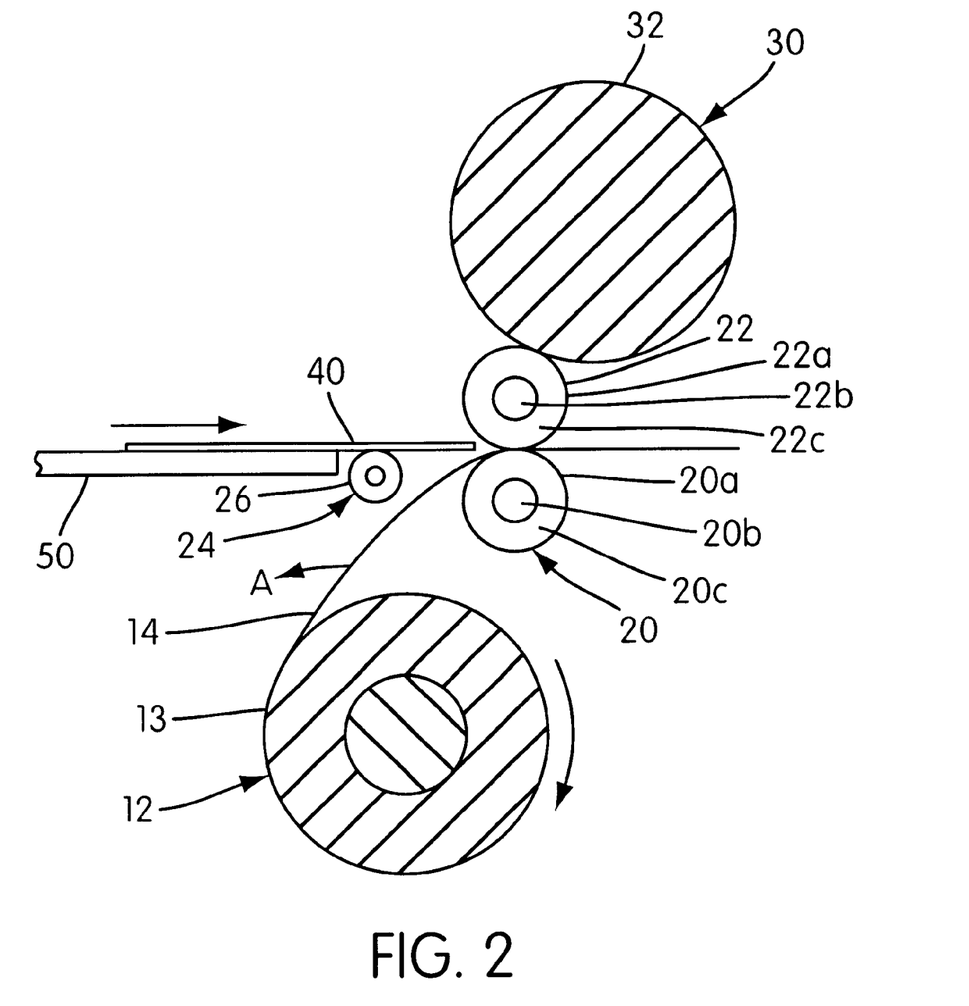
FIG. 2 is a partial sectional view showing the internal components of the apparatus of FIG. 1.

FIG. 1 shows an adhesive transfer device, generally indicated at 100, constructed in accordance with the principles of the present invention. The device 100 is designed to be used with a supply roll 12 that has a supply of an adhesive carrying substrate 14 wound up thereon. The adhesive carrying substrate 14 has a layer of pressure-sensitive adhesive coated on one side thereof.

The device 100 comprises a frame, generally indicated at 60, that includes a pair of spaced apart side walls 62, 64 that extend generally vertically and generally parallel to one another. A generally laterally extending cutter bar 68 having a serrated edge is provided between the rear edges of the side walls 62, 64. As substrates are discharged from the device, they can be raised upwardly into contact with the serrated edge of the cutter bar so as to sever the leading end of the substrate.

The frame 60 has two pairs of opposed slots 63, 65 and 67, 69 formed in the interiors of the side walls 62, 64. The first pair of slots 63, 65 extend generally vertically to the upper edges of the side walls 62, 64 and the second pair of slots 67, 69 extend generally horizontally to forward edges of the side walls 62, 64. The distance at which the first pair of slots 63, 65 terminate along the side walls 62, 64 is determined with regard to the positioning of the cooperating nip rollers 20, 22. Specifically, the slots 63, 65 should be formed in the frame 60 so that the adhesive pick-up device 30 when mounted in the slots 63, 65 will be positioned adjacent the upper nip roller 22. The role and function of the pick-up device 30 will be detailed later in the application.

The distance at which the second pair of slots 67, 69 terminate is also determined with regard to the positioning of the cooperating nip rollers 20, 22. Specifically, the slots 67, 69 should be formed in the side wall 62, 64 so that the supply roll 12 can be removably mounted thereto and then the adhesive carrying substrate 14 can be unwound from the supply roll 12 and fed in between the nip rollers 20, 22. It should be noted that the supply roll 12 has a pair of tabs 82 extending axially away from brake plates 80 on the core thereof and that these tabs are received in the slots 67, 69 to removably mount the supply roll 12. The tabs cooperate with the slots 67, 69 to maintain the brake plates 80 in a fixed position with respect to the frame 60 as the supply roll core (not shown) rotates to dispense the adhesive carrying substrate 14. As a result, the brake plates 80 apply friction to the supply roll core to pre-tension the dispensing of substrate 14. For more details concerning this braking feature, reference may be made to U.S. Pat. No. 5,574,962, the entirety of which is hereby incorporated in its entirety into the present application by reference. Any other suitable arrangement for providing braking friction may be used, including brakes mounted on the machine instead on the supply roll. In fact, the invention may be practiced in an arrangement where no braking friction is used.

As shown in FIG. 1, the nip rollers 20, 22 are rotatably mounted and transversely arranged in parallel relation between the side walls 62, 64 of the frame 60. Alternatively, the lower nip roller 20 may be held stationary while the upper nip roller 22 remains rotatably mounted. Either way, the nip rollers 20, 22 should cooperate to apply pressure to substrates fed therein and thus, in a broad sense, may be considered to be a pair of cooperating structures that cooperate to apply pressure to substrates fed therebetween.

Each of the nip rollers 20, 22 has an axial shaft 20b, 22b extending through the length thereof. Each of these axial shafts 20b, 22b is covered with a deformable sleeve 20c, 22c that provides a generally cylindrical substrate engaging surface 20a, 22a. The sleeves 20c, 22c may be formed from rubber or another suitably resilient material so that when substrates are fed between the nip rollers 20, 22, the substrate engaging surfaces 20a, 22a deform slightly to accommodate the thickness of the substrates and frictionally grip the substrates to advance the same between the nip rollers 20, 22. For reasons that will become apparent later in the application, the substrate engaging surface 22a has a greater affinity for adhesive bonding than the adhesive carrying substrate 14 of the supply roll 12 with which the device 100 of the present invention is to be used.

Figure 4A:
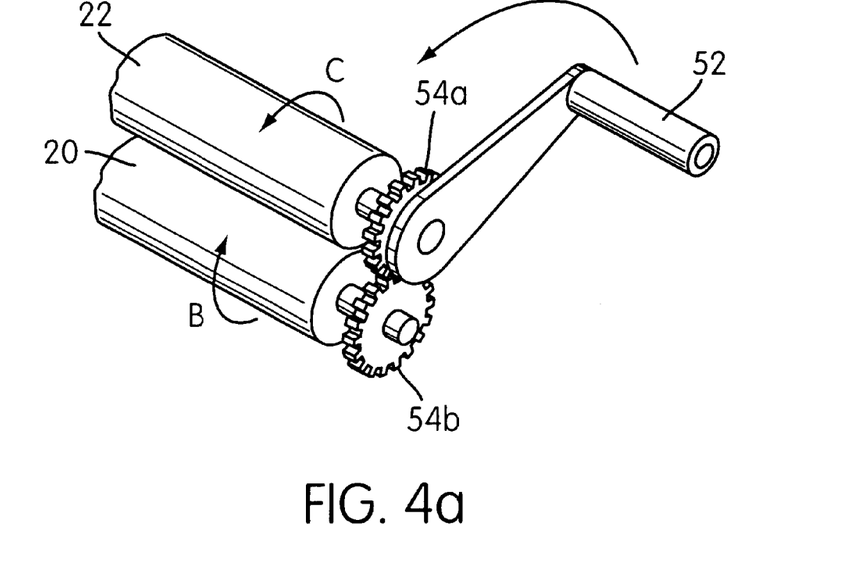
FIGS. 4a and 4b are partial perspective and elevational views, respectively, of the gears provided for counter-rotating the nip rollers.
Figure 4B:
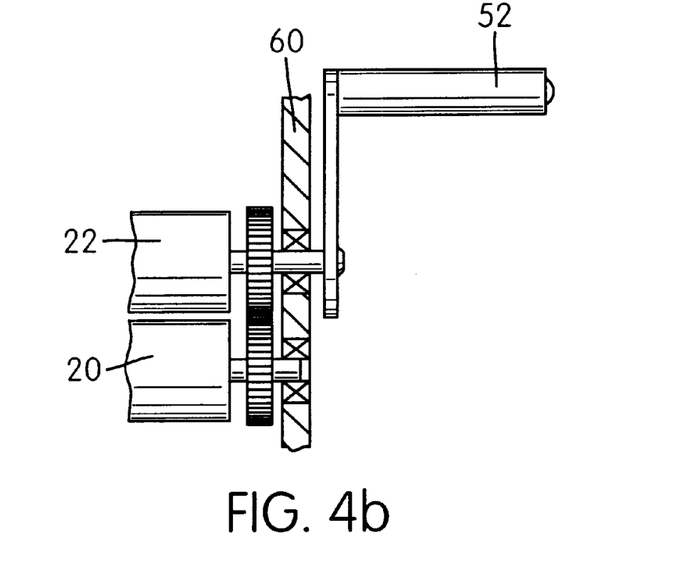

As shown best in FIG. 4b, the opposing end portions of the axial shafts 20b, 22b of the nip rollers 20, 22 are rotatably mounted in bushings press-fit into the side walls 62, 63 with one end of the upper nip roller 22 extending outwardly from the side wall 64. An actuator in the form of a manually rotatable crank handle 52 is fixedly connected to that end of the upper nip roller 22 so that manual operation of the crank handle 52 rotates the upper nip roller 22. A pinion gear 54a, 54b is fixedly connected to the end of each axial shaft 20b, 22b inwardly of side wall 64. The pinion gears 54a, 54b are intermeshed together so that rotation of the upper nip roller 22 under operation of crank 52 is translated into rotation of the lower nip roller 20 via the intermeshed pinion gears 54a, 54b. It is to be understood, however, that the pinion gears 54a, 54b may be omitted and that the counter-rotation of the nip rollers 20, 22 may be affected as a result of the nip rollers 20, 22 being tightly pressed against one another rather than by a geared arrangement.

Alternatively, an electric motor or any other suitable actuator may be used to rotate upper nip roller 22.

Figure 3:
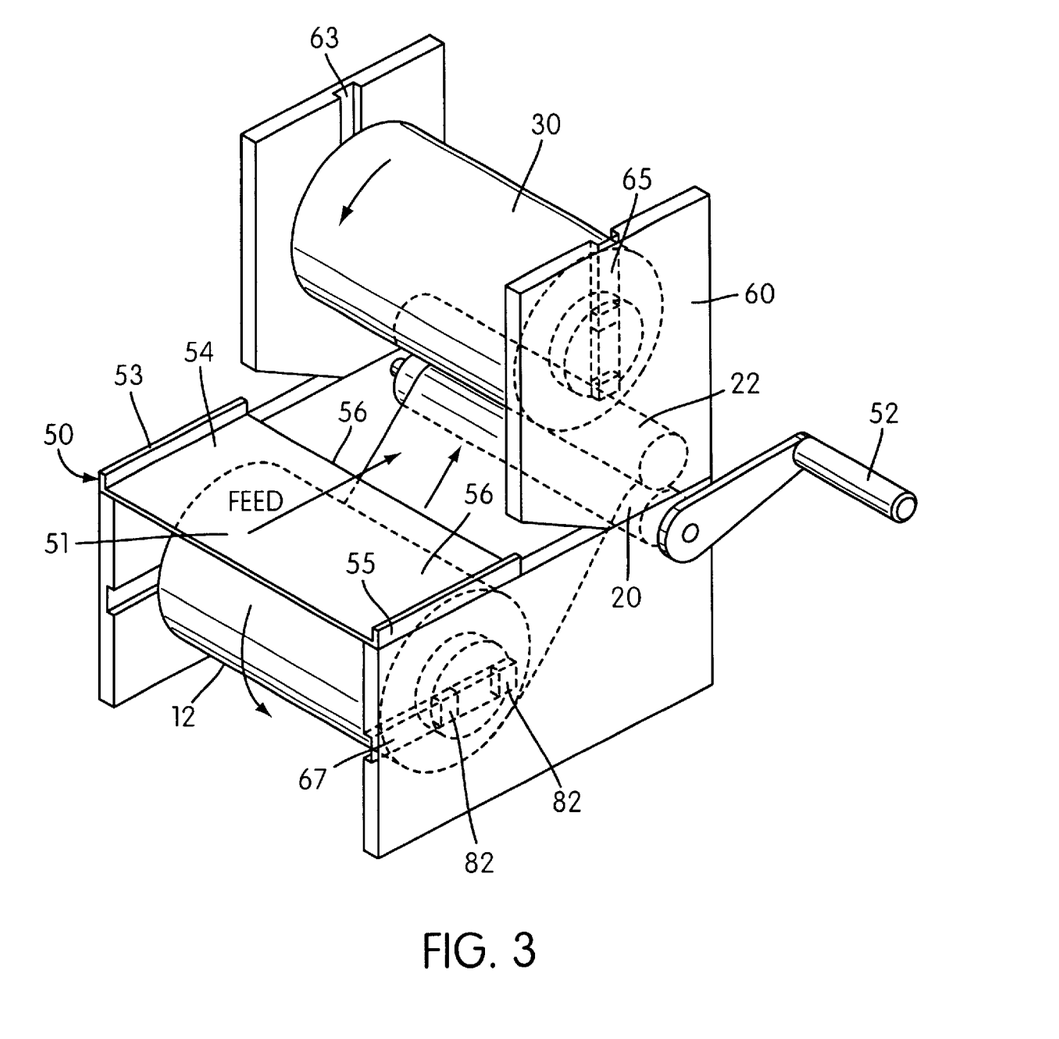
FIG. 3 is a perspective view similar to FIG. 1 showing the supply roll and pick-up rolls thereof mounted into operative positions.

As shown in FIGS. 1 and 3, a feeding tray 50 that supports and guides substrates as they are being fed between the nip rollers 20, 22 is disposed adjacent the feed side of the nip rollers 20, 22. The feeding tray 50 has a generally upwardly facing, generally planar supporting surface 51 that supports the substrates and a pair of flanges 53, 55 on opposing sides thereof for preventing the substrates from sliding or otherwise falling off the sides of the tray 50.

The feeding tray 50 may be fixedly attached to the frame 60. However, it is preferred to removably attached the feeding tray 50 so that feeding trays of various sizes can interchanged for feeding and supporting substrates of varying lengths as they are being fed into the nip rollers 20, 22.

The adhesive pick-up device 30 is removably mounted to the slots 63, 65 via a set of tabs 82 on each axial end thereof. In the embodiment illustrated, the adhesive pick-up device 30 is in the form of a generally cylindrical roller that provides a generally cylindrical adhesive pick-up surface 32 that has a greater affinity for adhesive bonding than the substrate engaging surface 22a of the upper nip roller 22. The device 30 is positioned adjacent the upper nip roller 22 with the pick-up surface 32 engaging the substrate engaging surface 22a in a rolling peripheral contact. During operation of the apparatus 100, rotation of the upper nip roller 22 will cause the roller 30 to rotate as a result of frictional rolling contact between the roller 30 and the nip roller 22. Alternatively, a gearing arrangement may be provided to ensure that the pick-up device roll 30 rotates along with the upper nip roller 22.

OPERATION

To initiate the adhesive transfer operation using the device 100, a selected substrate 40 to which adhesive is to be applied, such as a photograph, business card, or any other substrate to which adhesive will bond, is placed on the surface 51 of the feeding tray 50 and the adhesive carrying substrate 14 is unwound from the supply roll 12 and fed in between the nip rollers 20, 22 with the layer of adhesive 13 thereon facing the upper nip roller 22. The selected substrate 40 is then advanced in between the nip rollers 20, 22 so that the surface thereof to which the adhesive is to be applied comes into contact with the layer of adhesive 13 on carrying substrate 14.

Figure 5:
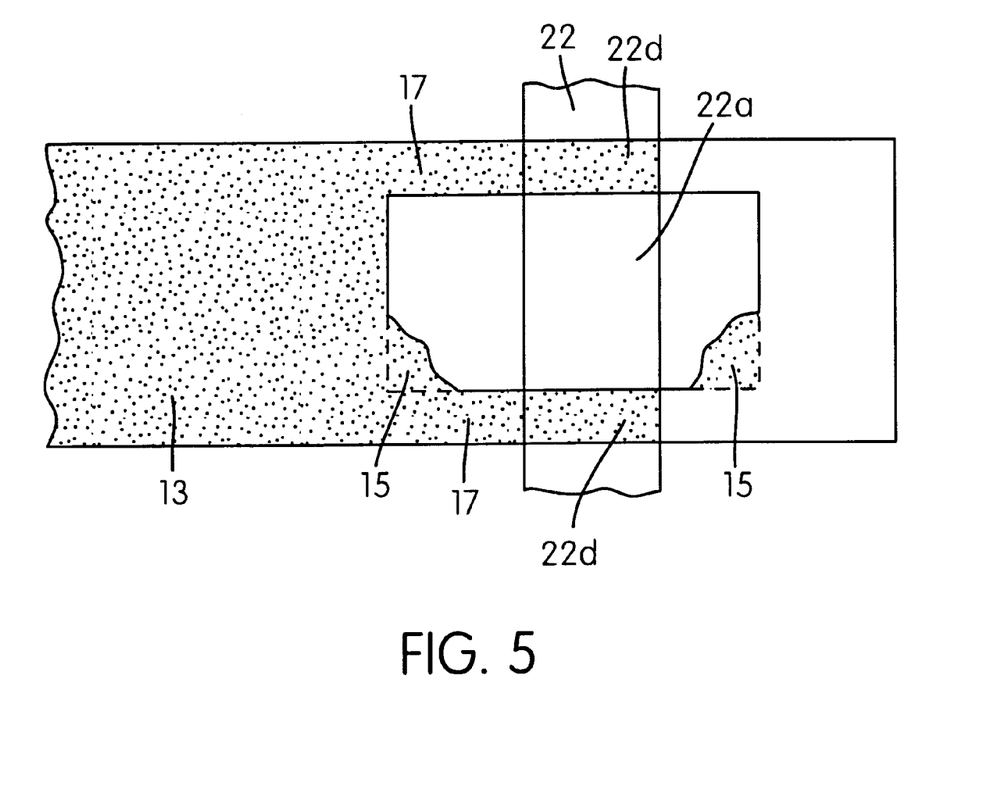
FIG. 5 is a top view of the adhesive carrying substrate with portions thereof cut-away to show the portion of the adhesive layer thereon which bonds to the underside of the selected substrate.

Then, the crank handle 52 is manually rotated to affect rotation of the nip rollers 20, 22, which cooperate to apply pressure to the substrates 14, 40 and advance them in a feeding direction out the discharge side of the nip rollers 20, 22. As the nip rollers 20, 22 apply pressure to the substrates 14, 40, a first portion 15 of the adhesive layer 13 which contacts the surface of the selected substrate 40 adheres to that surface so as to adhesively bond to the selected substrate 40. Also, a second portion 17 of the adhesive layer 13 which is exposed around the peripheral edge of the substrate 40 comes into contact with the pick-up portions 22d of the substrate engaging surface 22a of the upper nip roller 22 that are not shielded from exposure to the adhesive layer 13 by the selected substrate 40. This second portion 17 of the adhesive layer 13 adheres to the pick-up portions 22d of the substrate engaging surface 22a of the upper nip roller 22. Because the substrate engaging surface 22a has a greater affinity for adhesive bonding than the adhesive carrying substrate 14, the second portion 17 of the adhesive layer 13 will remain adhered to the substrate engaging surface 22a as the upper nip roller 22 continues to rotate and the substrates 14, 40 continue to advance in the feeding direction. As a result, the pick-up portions 22d of the upper nip roller 22 "pick up" the second portion 17 of the adhesive layer 13 (which is more commonly called the excess adhesive because it is not bonded to the substrate 40) from the portions of the adhesive carrying substrate 14 extending around the periphery of the selected substrate 40.

As discussed above, the pick-up surface 32 of the pick-up roller 30 engages the substrate engaging surface 22a of the upper nip roller 22 and the pick-up roller 30 rotates along with the upper nip roller 22 as a result of such engagement. As the upper nip roller 22 rotates during the adhesive transfer operation and the engaging surface thereof picks-up the so-called excess or second portion of the adhesive layer 13 from the substrate 14, a portion of the substrate engaging surface 22a comes into contact with the pick-up surface 32. Sufficient pressure is applied between the nip roller 22 and the pick-up roller 30 to ensure that the excess adhesive adhered to the substrate engaging surface 22a then adheres to the pick-up surface 32.

Because the pick-up surface 32 has a greater affinity for adhesive bonding than the substrate engaging surface 22a, the excess adhesive 17 will remain adhered to the pick-up surface rather than to the substrate engaging surface 22a. As a result, as the upper nip roller 22 and the pick-up roller 30 continue to counter-rotate relative to one another, the excess adhesive will be picked up by the pick-up surface 32 and removed from the substrate engaging surface 22a, thereby leaving that portion of the upper nip roller 22 substantially clean (i.e., devoid of adhesive) and ready to be brought into engagement with the substrates 14, 40 again as the nip rollers 20, 22 continue to rotate and the crank handle 52 continues to be actuated.

After the relevant portions of the pick-up surface 32 of the pick-up roller 30 are entirely coated with the excess adhesive, the user then removes pick-up roller 30 and cleans the same off with a suitable solvent or the like. The pick-up roller 30 is then replaced in the apparatus 10.

It should be noted that the diameter of the pick-up roller 30 is substantially greater than that of the upper nip roller 32. This allows for more rotations of the nip roller 22 per rotation of the pick-up roller 30. Alternatively, the pick-up surface 32 of the roller 30 may be provided by endless web that is wound up on a separate supply roll 30. In another alternative, the pick-surface of roller 30 may be provided by a plurality of paper webs wrapped around the roller 30 in a plurality of layers. As each layer has the excess adhesive built up on it, that layer can be peeled off to expose a new, clean layer.

It thus can be appreciated that the objectives of the present invention have been fully and effectively accomplished. The foregoing specific embodiment has been provided to illustrate the structural and functional principles of the present invention and are not intended to be limiting. To the contrary, the present invention is intended to encompass all modifications, alterations, and substitutions within the spirit and scope of the appended claims.

What is claimed:

1. An adhesive transfer device for use with a supply roll carrying a supply of an adhesive carrying substrate for performing an adhesive transfer operation on a selected substrate, said adhesive carrying substrate having a layer of pressure-sensitive adhesive coated on a surface thereof, said device comprising:

a frame;

first and second cooperating structures each having a substrate engaging surface, said first cooperating structure being a nip roller rotatably mounted to said frame;

said cooperating structures being mounted to said frame with said substrate engaging surfaces disposed adjacent one another so that the adhesive transfer operation can be initiated by inserting said adhesive carrying substrate and said selected substrate together between said cooperating structures with a first portion of the pressure-sensitive adhesive layer facing said selected substrate and a second portion of said adhesive layer adjacent a periphery of said selected substrate facing the substrate engaging surface of said rotatable nip roller;

said cooperating structures being constructed and arranged such that, after initiating said adhesive transfer operation as aforesaid, said adhesive transfer operation can be continued by advancing said selected substrate and said adhesive carrying substrate between said cooperating structures with the substrate engaging surfaces thereof cooperating to apply pressure to said substrates, thereby causing said first portion of said pressure-sensitive adhesive layer to adhere to said selected substrate and the second portion of said pressure-sensitive adhesive layer to adhere to a portion of the substrate engaging surface of said nip roller, said portion of the substrate engaging surface of said nip roller having a greater affinity for adhesive bonding than the surface of said adhesive carrying substrate on which said layer is coated so that as said substrates are discharged from between said cooperating structures, the second portion of said adhesive layer remains adhered to said portion of said nip roller rather than to said adhesive carrying substrate; and an adhesive pick-up device that has an adhesive pick-up surface that has a greater affinity for adhesive bonding than said portion of the substrate engaging surface of said nip roller, said adhesive pick-up device being disposed adjacent to said nip roller with said adhesive pick-up surface engaging the substrate engaging surface of said nip roller such that, as said nip roller rotates during said adhesive transfer operation, (a) said portion of said nip roller having said second portion of said adhesive layer adhered thereto engages the adhesive pick-up surface of said pick-up device with sufficient pressure to cause said second portion of said adhesive to adhere to said pick-up surface so that said second portion of said adhesive layer remains bonded to said adhesive pick-up surface rather than to the substrate engaging surface of said nip roller and (b) said adhesive pick-up device continually advances said adhesive pick-up surface so that the portions of said adhesive pick-up surface with said second portion of said adhesive layer adhered thereto is moved away as said nip roller continues to rotate and is replaced by a portion of said adhesive pick-up surface that is devoid of adhesive.

2. An apparatus according to claim 1, wherein said adhesive pick-up device is a pick-up roller engaged with said nip roller.

3. An apparatus according to claim 2, wherein the exterior surface of said pick-up roller is the pick-up surface and wherein said pick-up roller is removable from said frame to facilitate removal of excess adhesive from said pick-up surface.

4. An apparatus according to claim 3, wherein said web is one of a plurality of webs individually wrapped about said pick-up roller in a plurality of layers.

5. An apparatus according to claim 3, further comprising a take-up roller and wherein said web is an endless web wound about said pick-up roller and taken up by said take-up roller.

6. An apparatus according to claim 2, wherein said adhesive pick-up surface is provided by a web wrapped on said pick-up roller.

7. An apparatus according to claim 1, wherein an actuator selectively rotates said nip roller to affect said advancement of said selected substrate and said adhesive carrying substrate.

8. A combination comprising:
a supply roll carrying a supply of an adhesive carrying substrate, said adhesive carrying substrate having a layer of pressure-sensitive adhesive coated on a surface thereof;
an adhesive transfer device for use with the supply roll for performing an adhesive transfer operation on a selected substrate;
said adhesive transfer device comprising:
a frame;
first and second cooperating structures each having a substrate engaging surface, said first cooperating structure being a nip roller rotatably mounted to said frame;
said cooperating structures being mounted to said frame with said substrate engaging surfaces disposed adjacent one another so that the adhesive transfer operation can be initiated by inserting said adhesive carrying substrate and said selected substrate together between said cooperating structures with a first portion of the pressure-sensitive adhesive layer facing said selected substrate and a second portion of said adhesive layer adjacent a periphery of said selected substrate facing the substrate engaging surface of said rotatable nip roller;

said cooperating structures being constructed and arranged such that, after initiating said adhesive transfer operation as aforesaid, said adhesive transfer operation can be continued by advancing said selected substrate and said adhesive carrying substrate between said cooperating structures with the substrate engaging surfaces thereof cooperating to apply pressure to said substrates, thereby causing said first portion of said pressure-sensitive adhesive layer to adhere to said selected substrate and the second portion of said pressure-sensitive adhesive layer to adhere to a portion of the substrate engaging surface of said nip roller, said portion of the substrate engaging surface of said nip roller having a greater affinity for adhesive bonding than the surface of said adhesive carrying substrate on which said layer is coated so that as said substrates are discharged from between said cooperating structures, the second portion of said adhesive layer remains adhered to said portion of said nip roller rather than to said adhesive carrying substrate; and an adhesive pick-up device that has an adhesive pick-up surface that has a greater affinity for adhesive bonding than said portion of the substrate engaging surface of said nip roller, said adhesive pick-up device being disposed adjacent to said nip roller with said adhesive pick-up surface engaging the substrate engaging surface of said nip roller such that, as said nip roller rotates during said adhesive transfer operation, (a) said portion of said nip roller having said second portion of said adhesive layer adhered thereto engages the adhesive pick-up surface of said pick-up device with sufficient pressure to cause said second portion of said adhesive to adhere to said pick-up surface so that said second portion of said adhesive layer remains bonded to said adhesive pick-up surface rather than to the substrate engaging surface of said nip roller and (b) said adhesive pick-up device continually advances said adhesive pick-up surface so that the portions of said adhesive pick-up surface with said second portion of said adhesive layer adhered thereto is moved away as said nip roller continues to rotate and is replaced by a portion of said adhesive pick-up surface that is devoid of adhesive.

9. A combination according to claim 8, wherein said adhesive pick-up device is a pick-up roller engaged with said nip roller.

10. A combination according to claim 9, wherein the exterior surface of said pick-up roller is the pick-up surface and wherein said pick-up roller is removable from said frame to facilitate removal of excess adhesive from said pick-up surface.

11. A combination according to claim 10, wherein said web is one of a plurality of webs individually wrapped about said pick-up roller in a plurality of layers.

12. A combination according to claim 10, further comprising a take-up roller and wherein said web is an endless web wound about said pick-up roller and taken up by said take-up roller.

13. A combination according to claim 9, wherein said adhesive pick-up surface is provided by a web wrapped on said pick-up roller.

14. A combination according to claim 8, wherein an actuator selectively rotates said nip roller to affect said advancement of said selected substrate and said adhesive carrying substrate.

15. A method for performing an adhesive transfer operation, the method comprising:

providing a supply roll carrying a supply of an adhesive carrying substrate, said adhesive carrying substrate having a layer of pressure-sensitive adhesive coated on a surface thereof;

inserting said adhesive carrying substrate and a selected substrate together between substrate engaging surfaces of first cooperating structure defined by a rotatable nip roller and a second cooperating structure of an adhesive transfer device with a first portion of the pressure-sensitive adhesive layer facing said selected substrate and a second portion of said adhesive layer adjacent a periphery of said selected substrate facing the substrate engaging surface of said rotatable nip roller;

advancing said selected substrate and said adhesive carrying substrate between said cooperating structures with the substrate engaging surfaces thereof cooperating to apply pressure to said substrates, thereby causing said first portion of said pressure-sensitive adhesive layer to adhere to said selected substrate and the second portion of said pressure-sensitive adhesive layer to adhere to a portion of the substrate engaging surface of said nip roller, said portion of the substrate engaging surface of said nip roller having a greater affinity for adhesive bonding than the surface of said adhesive carrying substrate on which said layer is coated so that as said substrates are discharged from between said cooperating structures, the second portion of said adhesive layer remains adhered to said portion of said nip roller rather than to said adhesive carrying substrate; and operating an adhesive pick-up device that has an adhesive pick-up surface that has a greater affinity for adhesive bonding than said portion of the substrate engaging surface of said nip roller, said adhesive pick-up device being disposed adjacent to said nip roller with said adhesive pick-up surface engaging the substrate engaging surface of said nip roller such that, as said nip roller rotates during said adhesive transfer operation, (a) said portion of said nip roller having said second portion of said adhesive layer adhered thereto engages the adhesive pick-up surface of said pick-up device with sufficient pressure to cause said second portion of said adhesive to adhere to said pick-up surface so that said second portion of said adhesive layer remains bonded to said adhesive pick-up surface rather than to the substrate engaging surface of said nip roller and (b) said adhesive pick-up device continually advances said adhesive pick-up surface so that the portions of said adhesive pick-up surface with said second portion of said adhesive layer adhered thereto is moved away as said nip roller continues to rotate and is replaced by a portion of said adhesive pick-up surface that is devoid of adhesive.

16. A method according to claim 15, wherein said adhesive pick-up device is a pick-up roller engaged with said nip roller, said operating said adhesive pick-up device including rotating said pick-up roller in engagement with said nip roller.

17. A method according to claim 16, wherein the exterior surface of said pick-up roller is the pick-up surface and wherein said pick-up roller is removable from a frame of the adhesive transfer device to facilitate removal of excess adhesive from said pick-up surface, said method further comprising removing said pick-up roller from the frame and removing the excess adhesive from the pick-up surface.

* * * * *